United States Patent [19]

Daub

[11] Patent Number: 5,241,242
[45] Date of Patent: Aug. 31, 1993

[54] POWER-SUPPLY CIRCUIT APPARATUS FOR HIGH PRESSURE GAS DISCHARGE LAMPS IN MOTOR VEHICLES

[75] Inventor: Wolfgang Daub, Lippstadt, Fed. Rep. of Germany

[73] Assignee: Hella KG Hueck & Co., Lippstadt, Fed. Rep. of Germany

[21] Appl. No.: 889,425

[22] Filed: May 28, 1992

[30] Foreign Application Priority Data

May 29, 1991 [DE] Fed. Rep. of Germany ....... 4117589

[51] Int. Cl.$^5$ .............................................. B60Q 1/02
[52] U.S. Cl. ..................................... 315/82; 315/308; 315/DIG. 7; 315/205; 315/209 R; 315/289; 315/127
[58] Field of Search ...................... 315/82, 77, DIG. 7, 315/307, 308, 291, 205, 208, 209 R, 219, 289, 290, 127; 363/18, 20, 21, 22, 23; 362/61, 83.3

[56] References Cited

U.S. PATENT DOCUMENTS

| | | | |
|---|---|---|---|
| 4,563,719 | 1/1986 | Nilssen | 361/45 |
| 4,613,934 | 9/1986 | Padolok | 315/DIG. 7 |
| 4,724,360 | 2/1988 | Luursema | 315/82 |
| 4,943,886 | 7/1990 | Quazi | 361/42 |
| 5,047,695 | 9/1991 | Allen et al. | 315/82 |
| 5,084,653 | 1/1992 | Nilssen | 315/DIG. 7 |
| 5,103,143 | 4/1992 | Daub | 315/308 |
| 5,142,203 | 8/1992 | Oda et al. | 315/308 |

FOREIGN PATENT DOCUMENTS

| | | |
|---|---|---|
| 0350104 | 1/1990 | European Pat. Off. . |
| 1918417 | 10/1970 | Fed. Rep. of Germany . |
| 3445817 | 6/1986 | Fed. Rep. of Germany . |
| 4002334 | 8/1990 | Fed. Rep. of Germany . |
| 3928810A1 | 3/1991 | Fed. Rep. of Germany . |
| WO91/02442 | 2/1991 | PCT Int'l Appl. . |

*Primary Examiner*—Robert J. Pascal
*Assistant Examiner*—Michael B. Shingleton
*Attorney, Agent, or Firm*—Griffin, Butler, Whisenhunt & Kurtossy

[57] ABSTRACT

In a power-supply circuit apparatus for high pressure gas discharge lamps in motor vehicles which is fed from a vehicle battery wherein the power-supply circuit apparatus, which produces a lamp supply voltage and an ignition auxiliary voltage, has at least one voltage converter coupled to the vehicle battery and a vehicle ground connection and is electrically-conductively coupled to an ignition device for igniting and operating a high pressure gas discharge lamp, the lamp supply voltage and/or the ignition auxiliary voltage is produced by the voltage converter to be physically separated from the battery voltage of the vehicle battery and a reference voltage level for the ignition auxiliary voltage and/or the lamp supply voltage is coupled to the vehicle ground connection via a low-resistance first precision resistor for measuring purposes. This arrangement provides a power-supply circuit apparatus wherein people are best protected from electric shock when touching live parts of the power-supply circuit apparatus and wherein the power-supply circuit apparatus is safely protected from faults such as short circuits or excess currents.

13 Claims, 1 Drawing Sheet

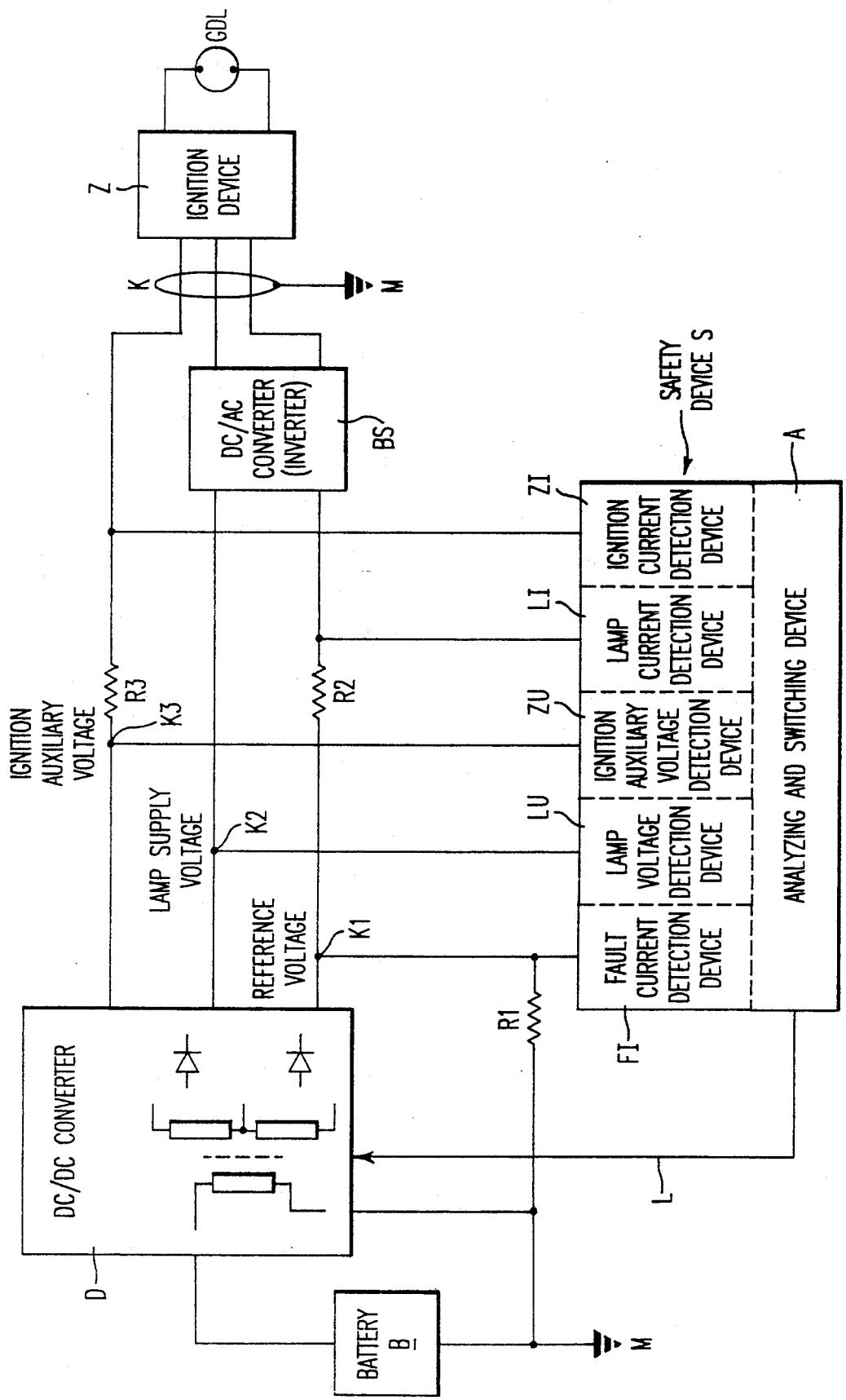

POWER-SUPPLY CIRCUIT APPARATUS FOR HIGH PRESSURE GAS DISCHARGE LAMPS IN MOTOR VEHICLES

BACKGROUND OF THE INVENTION

This invention relates generally to a power-supply circuit apparatus for high pressure gas discharge lamps for motor vehicles which is fed from a vehicle battery wherein the power-supply circuit apparatus has at least one voltage converter, connected with the vehicle battery and a vehicle ground connection, which produces a lamp supply voltage and/or an ignition auxiliary voltage and which is electrically-conductively coupled to an ignition device for igniting and operating high pressure gas discharge lamps.

A power-supply circuit apparatus is known from German patent document DE 34 45 817 C2 which has a circuit arrangement for operating a high pressure gas discharge lamp with low dc voltage. This power-supply circuit apparatus has at least one voltage converter connected to a vehicle battery and a vehicle ground connection. The at least one voltage converter produces a lamp supply voltage and/or an ignition auxiliary voltage, and is electrically-conductively coupled to an ignition device for igniting and operating a high pressure gas discharge lamp. In an embodiment shown in DE 34 45 817 C2, which is very complicated and cost-intensive, a supply-voltage pre-controller, which includes a dc/dc converter, is coupled to an ignition device of an ac-high pressure gas discharge lamp via a transistor invertor, a rectifier and a NF (low frequency) square-wave invertor. The circuit arrangement also includes supervising electronics which can detect deviations of supply voltage from a predetermined window range and turn off the power-supply circuit apparatus when such a deviation occurs. In addition, the supervising electronics offer polarity protection.

During operation of the power-supply circuit apparatus the cables, or connections, between individual components, and in particular connections to the ignition device, have voltages which can be dangerous for persons touching them. A person can come in contact with the cables when, for example, he attempts to do repair work, or when cables have become exposed in headlight areas or motor spaces of motor vehicles, for example due to an accident. It proves to be disadvantageous with circuit arrangements of the prior art that persons who touch live (having voltage applied thereto) parts of the power-supply circuit apparatus are not protected against electric shocks, thereby allowing for high potential danger for these persons.

It is an object of this invention to provide a power-supply circuit apparatus for high pressure gas discharge lamps in motor vehicles wherein persons, who touch live parts of the power-supply circuit apparatus, are protected as best possible, and wherein the power-supply circuit apparatus is dependably protected from malfunctions such as short circuits or excess currents.

SUMMARY OF THE INVENTION

According to principles of this invention, a lamp supply voltage and/or an ignition auxiliary voltage are produced by means of a voltage converter, while being physically (conductively) separated from a battery voltage of a motor vehicle battery, and by connecting a reference voltage level for the ignition auxiliary voltage and/or the lamp supply voltage to a vehicle ground connection via a low-resistance first precision resistor for measurement purposes.

BRIEF DESCRIPTION OF THE DRAWINGS

The invention is described and explained in more detail below using the embodiment shown in the drawing. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawing in which reference characters refer to the same parts throughout. The drawing is not necessarily to scale, emphasis instead being placed upon illustrating principles of the invention in a clear manner.

The drawing is a combined schematic and block diagram depicting a power-supply circuit for a gas discharge lamp, a battery and a gas discharge lamp being depicted therewith.

DESCRIPTION OF A PREFERRED EMBODIMENT

The embodiment described herein is a power-supply circuit apparatus for operating an ac high pressure gas discharge lamp in motor vehicles. The power-supply circuit apparatus is herein fed by a vehicle battery B. In this embodiment a dc/dc converter D is electrically-conductively coupled to the vehicle battery B and the vehicle ground connection M. The dc/dc converter D produces from the battery voltage of the vehicle battery B a lamp supply voltage which is applied to a second output terminal K2 and an ignition auxiliary voltage which is applied to the third output terminal K3. The first output terminal K1 of the dc/dc converter D delivers a reference voltage level for the ignition auxiliary voltage and the lamp supply voltage.

The dc/dc converter D is electrically-conductively coupled via the third output terminal K3, to which the ignition auxiliary voltage is applied, to an ignition device Z which provides an ignition voltage from the ignition auxiliary voltage applied to it suitable to ignite the high pressure gas discharge lamp GDL which is connected to the ignition device Z.

In this embodiment, the lamp supply voltage, applied to the second output terminal K2, is fed to an invertor (apparatus for converting direct current to alternating current) BS, which is constructed herein as an interruption, or bridge, switch BS (such as a spark gap) and is also coupled to the dc/dc converter D via the first output terminal K1. This interruption switch BS is necessary, for example, when the high pressure gas discharge lamp GDL is an ac high pressure gas discharge lamp GDL. In this embodiment, the interruption switch BS is coupled to the high pressure gas discharge lamp GDL via the ignition device Z. If one power-supply circuit apparatus operates several high pressure gas discharge lamps GDL, for example in an alternating manner, or if the at least one ignition device Z is spacially separated from the remainder of the power-supply circuit apparatus, the ignition device Z can be coupled to the dc/dc converter D and/or the interruption switch BS via a shielded cable K. The shielded cable K is herein coupled to the vehicle ground connection M.

The first output terminal K1 of the dc/dc converter D is electrically-conductively coupled to the vehicle ground connection M via a low-resistance first precision, or measuring, resistor R1. The first output terminal K1 is also coupled to a fault current detection device FI of a safety device S. If live parts (parts with voltage thereon) of the power-supply circuit apparatus are touched, a fault current flows through the vehicle ground connection M and the first precision resistor R1. There occurs a voltage drop at the first, low-resistance, precision resistor R1 and the fault current detection device FI determines the corresponding fault current to this voltage drop. An analyzing and switching device A of the safety device S analyzes the measured fault current and produces a cut-off signal if the fault current exceeds a predetermined value. The predetermined value can be, for example, approximately 20 to 30 mA leading to very good contact protection and high safety for persons who touch live parts of the power-supply circuit apparatus. The safety device S is electrically-conductively coupled to the dc/dc converter D over line L and transmits thereover a cut-off signal such that the dc/dc converter D is turned off, thereby switching off the entire power-supply circuit apparatus until it is switched on again. Measuring such small fault currents is only possible and only feasible with such high certainty when the output voltages produced at the output terminals K1, K2, K3, are produced physically (conductively) separated from the voltage supply, that is, the vehicle battery B. This can be accomplished by an appropriately structured transformer, for example, which is indicated in the drawing in the box depicting the dc/dc converter D. In the drawing, the dc/dc converter D also depicts rectifiers.

The low-resistance first precision resistor R1 may, for example, have a resistance value of approximately 1 Ohm. The resistance value, however, is to be chosen according to application.

For the detection of short circuits between connections to the lamp supply, for example, which may lead to malfunctions of the power-supply circuit apparatus and to destruction of parts thereof, a second precision resistor R2 is arranged in the line between the first output terminal K1 and the interruption switch BS. The connection between the second precision resistor R2 and the interruption switch BS is electrically-conductively coupled to a lamp current detection device LI of the safety device S, which in turn is coupled to the analyzing and switching device A of the safety device S, in order to produce a cut-off signal for the dc/dc converter D in case of short circuits or faults in the lamp current.

In order to detect, for example, faults in the ignition current or short circuits in connections to the lamp supply, a third precision resistor R3 is arranged between the third output terminal K3 and the ignition device Z. The connection between the third precision resistor R3 and the ignition device Z is electrically-conductively coupled to an ignition current detection device ZI of the safety device S and is thereby coupled to the analyzing and switching device A of the safety device S for producing a cut-off signal for the dc/dc converter D if, for example, a short circuit or a fault in the ignition current occurs.

The second output terminal K2 of the dc/dc converter D is electrically-conductively coupled to a lamp voltage detection device LU of the safety device S for detecting the lamp supply voltage and is thereby also connected to the analyzing and switching device A. For determining the ignition auxiliary voltage, an ignition auxiliary voltage detection device ZU of the safety device S is electrically-conductively coupled to the third output terminal K3 as well as to the analyzing and switching device A.

If the fault current detection device FI and/or the lamp voltage detection device LU and/or the ignition auxiliary voltage detection device ZU and/or the lamp current detection device LI and/or the ignition current detection device ZI determine values which deviate from predetermined values stored for example in the analyzing and switching device A, the analyzing and switching device A of the safety device S produces cut-off signals which control the dc/dc converter D such that it is turned off and that operation of the entire power-supply circuit apparatus is stopped until its next start.

In another embodiment, the analyzed measured values can serve in particular to control and/or regulate a light output of the power-supply circuit apparatus depending upon various parameters such as switch-on times, cold starts, hot starts and lamp temperatures.

In other embodiments, use of interruption switches BS is not necessary, for example, if the high pressure gas discharge lamp GDL to be governed is a dc-high pressure gas discharge lamp GDL.

In another embodiment the dc/dc converter D can also be replaced by an invertor BS or a dc/ac converter BS. In this case as well, use of an additional interruption switch BS is not necessary.

It is beneficial that a lamp supply voltage and/or an ignition auxiliary voltage are produced by a voltage converter, physically (conductively) separated from a battery voltage of a vehicle battery, and that a reference voltage level for the ignition auxiliary voltage and/or the lamp supply voltage is coupled to a vehicle ground connection via a low-resistance first precision resistor, because in this uncomplicated and cost-effective manner, due to a voltage drop at the low-resistance first precision resistor, which determines the reference voltage level of the power-supply circuit apparatus, even minimal fault currents can be measured and determined, which occur for example when a person touches live parts of the power-supply circuit apparatus.

Such an uncomplicated and cost-effective fault current detection can offer high safety during operation of power-supply circuit apparatus for high pressure gas discharge lamps in motor vehicles when a fault current signal for switching off the power-supply circuit apparatus is produced in response to a voltage drop at the low-resistance precision resistor. Physically separating (with no conduction therebetween) the battery voltage from the output voltages of the voltage converter ensures thereby detectability of small fault currents with high degree of certainty by means of the low-resistance precision resistor. Physical (conductive) separation can be achieved by using an appropriate transformer circuit arrangement.

It is beneficial that the precision resistor is electrically-conductively coupled to a safety device, that the safety device has a fault current detection device, that the safety device has an analyzing and switching device which produces a cut-off signal when a fault current determination device detects a predetermined fault current, and that the safety device is coupled electrically-conductively to the voltage converter, because in this particularly uncomplicated manner, when a voltage drop occurs, a fault current can be detected at the low-resistance first precision resistor, and this detected fault current can be used, depending upon its size, to interrupt the voltage supplied by the voltage converter by means of a produced cut-off signal, thereby switching off the entire power-supply circuit apparatus which leads to high safety, in particular for persons touching live parts of the power-supply circuit apparatus. The fault currents, which cause the cut-off of the power-supply circuit apparatus by means of the safety device, can range in size, for example, from 20 to 30 mA. Depending upon application, these figures can also be larger or smaller.

Arranging a second precision resistor for measurement purposes in the connection between the voltage converter and the ignition device, which has the reference voltage level, offers the opportunity, in an uncomplicated and cost-effective manner, to determine occurring lamp currents during operation of the high pressure gas discharge lamp through a voltage drop at the second precision resistor.

In this respect, it proves to be particularly beneficial that the safety device connects electrically-conductively the second precision resistor and the ignition device, and that the safety device has a lamp current detection device which is coupled to the analyzing and switching device whereby a lamp current flowing during operation of the high pressure gas discharge lamp as well as at the start thereof can be determined with a high accuracy in an uncomplicated and cost-effective manner. By measuring and determining the lamp current, faults in the lamp current, which may be caused for example by short circuits between cables, can be detected easily and reliably. The analyzing and switching device of the safety device produces a cut-off signal at the occurrence of such malfunctions as well as at the occurrence of fault currents which is transmitted to the voltage converter and switches the voltage converter, and thereby the entire power-supply circuit apparatus, off, resulting in high safety during operation of the power-supply circuit apparatus.

It is beneficial that a third precision resistor is arranged in the connection between the voltage converter and the ignition device which transmits the ignition auxiliary voltage, because in this uncomplicated and cost-effective manner the ignition current can be reliably determined through a voltage drop at the third precision resistor.

In this respect, it is particularly beneficial to connect the link between the third precision resistor and the ignition device also to the safety device, and that the safety device has an ignition current detection device which is coupled to the analyzing and switching device, because in this uncomplicated and cost-effective manner the ignition current can be reliably determined at the start of the high pressure gas discharge lamp, and because at the occurrence of faults in the ignition current, for example caused by short circuits, a cut-off signal can be produced by the analyzing and switching device which is transmitted from the safety device to the voltage converter to cause a switching off thereof, and thereby a switch off of the ignition device, resulting in high safety during operation of the power-supply circuit apparatus.

It is beneficial for the voltage converter to be a dc/dc converter having physically separated input and output voltages, for the dc/dc converter to have a second output terminal to which the lamp supply voltage is applied, for the dc/dc converter to have a third output terminal to which the ignition auxiliary voltage is applied, for the dc/dc converter to have a first output terminal which provides the reference voltage level for the lamp supply voltage and the ignition auxiliary voltage, and for the first output terminal to be coupled to the first precision resistor and to the fault current detection device of the safety device, because herewith is provided a power-supply circuit apparatus which is constructed particularly uncomplicatedly and which can be manufactured in a cost-effective way for operation of high pressure gas discharge lamps wherein even small contact currents, which are determined by the fault current detection device from a measured voltage drop at the first precision resistor, cause reliable cut-off of the power-supply circuit apparatus.

By connecting the second output terminal to a lamp voltage detection device of the safety device, the lamp voltage can, in an uncomplicated and cost-effective way, be checked for faults by the safety device and possible short circuits can be detected.

By connecting the third output terminal to an ignition auxiliary voltage detection device of the safety device, the benefit of checking the ignition auxiliary voltage for faults is derived in an uncomplicated and cost-effective manner.

A further benefit is achieved by measuring lamp voltages, lamp currents, ignition auxiliary voltages and ignition currents whereby these measured values can also be used in an uncomplicated manner for regulating or guiding the ignition operation and/or operation of the high pressure gas discharge lamp.

It is beneficial to arrange an invertor in the connection between the dc/dc converter and the ignition device, because in this uncomplicated and cost-effective manner an ac high pressure gas discharge lamp can be operated by the power-supply circuit apparatus with high reliability.

It is further beneficial that the voltage converter is an invertor (dc to ac converter) whereby a particularly uncomplicated structure for operating an ac high pressure gas discharge lamp is achieved when operating without using a dc/dc converter.

It is also beneficial to completely turn off the entire power-supply circuit apparatus until the next turn-on attempt by means of the cut-off signal produced by the safety device, because this ensures the elimination of any electric-shock hazard for people from live parts at the occurrence of predetermined fault currents or faults in the lamp voltage, in the ignition auxiliary voltage, in the ignition current, or in the lamp current, and because it also ensures that components of the power-supply circuit apparatus, for example in the event of short circuits, are not destroyed.

It is further beneficial to connect the ignition device to the voltage converter via a shielded cable which results in a reliable, safe structure of the power-supply circuit apparatus, if the ignition device with the high pressure gas discharge lamp is dimensionally, or spacially, separated from the remainder of the power-supply circuit apparatus and good protection from interference radiation is achieved.

The ignition device Z can be a superimposed ignition device or a resonance ignition device, as is known from prior art.

The embodiments of the invention in which an exclusive property or privilege are claimed and defined as follows:

1. A power-supply circuit apparatus for high pressure gas discharge lamps in motor vehicles, fed a battery voltage relative to a voltage on a vehicle ground terminal from a vehicle battery terminal, wherein the power-supply circuit apparatus has at least one voltage converter means which is coupled to the vehicle battery terminal and to the vehicle ground terminal for producing at least one of a lamp supply voltage and an ignition auxiliary voltage relative to a reference voltage level and which is electrically-conductively coupled to an ignition device for providing electrical energy for igniting and operating a high pressure gas discharge lamp, wherein the at least one voltage converter includes means for producing the at least one of the lamp supply voltage and ignition auxiliary voltage and a reference voltage at the reference voltage level to be conductively, physically, separated from the battery voltage of the vehicle battery other than through said vehicle ground terminal, and wherein said reference voltage for the at lest one of the ignition auxiliary voltage and the lamp supply voltage is coupled to the vehicle ground connection via a low-resistance, first precision resistor for measurement purposes.

2. Power-supply circuit apparatus as in claim 1 wherein the first precision resistor for measuring purposes is electrically-conductively coupled to a safety device, the safety device has a fault current detection means for detecting a fault current, the safety device has an analyzing and switching device which produces a cut-off signal when the fault current detection means detects a predetermined fault current, and wherein the safety device is electrically-conductively coupled via a conductor to the voltage converter over which said cut-off signal is applied to said voltage converter.

3. A power-supply circuit apparatus as in claim 2 wherein a second precision resistor is arranged in a connection between the reference voltage of the voltage converter and the ignition device.

4. A power-supply circuit apparatus as in claim 3 wherein the safety device is electrically-conductively linked to the coupling between the second precision resistance and the ignition device, and wherein the safety device has a lamp current detection means for determining the lamp current which is coupled to the analyzing and switching device.

5. A power-supply circuit apparatus as in claim 4 wherein a third precision resistor is arranged in a connection between the voltage converter and the ignition device, which transmits a voltage proportional to the ignition auxiliary voltage.

6. A power-supply circuit apparatus as in claim 5 wherein a connection between the third precision resistor and the ignition device is simultaneously connected with the safety device and wherein the safety device has an ignition current detection means which is coupled to the analyzing and switching device.

7. A power-supply circuit apparatus as in claim 6 wherein the voltage converter is a dc/dc convertor, wherein the dc/dc convertor has a second output terminal, to which is applied a lamp supply voltage, wherein the dc/dc convertor has a third output terminal to which is applied the ignition auxiliary voltage, wherein the dc/dc convertor has a first output terminal, to which is applied the reference voltage level for the lamp supply voltage and the ignition auxiliary voltage, and wherein the first output terminal is coupled to the first precision resistor and the fault current detection means of the safety device.

8. A power-supply circuit apparatus as in claim 7 wherein the second output terminal is coupled to a lamp voltage detection means of the safety device.

9. A power-supply circuit apparatus as in claim 8 wherein the third output terminal is coupled to an ignition auxiliary voltage detection means of the safety device.

10. A power-supply circuit apparatus as in claim 9 wherein an invertor is arranged in a coupling between the dc/dc converter and the ignition device.

11. A power-supply circuit apparatus as in claim 10 wherein the third output terminal of the dc/dc converter is coupled electrically to the ignition device.

12. A power-supply circuit apparatus as in claim 2 wherein a cut-off signal, produced by the safety device, completely shuts down the entire power-supply circuit apparatus until a next switch-on attempt.

13. A power-supply circuit apparatus as in claim 1 wherein the ignition device is coupled to the voltage converter via a shielded conductor cable.

* * * * *